United States Patent [19]

Kondo

[11] Patent Number: 4,679,721
[45] Date of Patent: Jul. 14, 1987

[54] APPARATUS FOR FUSE-BONDING ARTICLES

[75] Inventor: Kenshi Kondo, Tokyo, Japan

[73] Assignee: Nihon Den-Netsu Keiki Co., Ltd., Tokyo, Japan

[21] Appl. No.: 908,025

[22] Filed: Sep. 16, 1986

[30] Foreign Application Priority Data

Sep. 17, 1985 [JP] Japan .................. 60-203343
Sep. 17, 1985 [JP] Japan .................. 60-203344

[51] Int. Cl.$^4$ .............................................. B23K 1/08
[52] U.S. Cl. ........................................ 228/40; 228/46; 134/105
[58] Field of Search ............... 228/46, 40, 242, 37, 228/240; 134/105, 109, 107; 165/104.14, 104.21

[56] References Cited

U.S. PATENT DOCUMENTS

| 3,656,492 | 4/1972 | Holm et al. ................. 134/109 |
| 3,765,475 | 10/1973 | Hooper . |
| 3,866,307 | 2/1975 | Pfahl, Jr. et al. . |
| 3,904,102 | 9/1975 | Chu et al. ................... 228/242 |
| 4,022,371 | 5/1977 | Iharvinko et al. ........... 228/242 |
| 4,032,033 | 6/1977 | Chu et al. . |
| 4,538,757 | 9/1985 | Bertiger . |

FOREIGN PATENT DOCUMENTS 0106295  4/1984  European Pat. Off. .
2105208  3/1983  United Kingdom .

Primary Examiner—Nicholas P. Godici
Assistant Examiner—Karen Skillman
Attorney, Agent, or Firm—Stephen F. K. Yee

[57] ABSTRACT

A vapor phase bonding apparatus wherein articles to be bonded are heated with hot vapors of a heat transfer liquid so that a bonding agent such as a solder provided between the articles to be bonded is melted to effect the bonding. The apparatus includes a vessel for containing the heat transfer liquid, a heater for vaporizing the heat transfer liquid, inlet and outlet port means provided in the vessel to allow the passage of articles to be bonded therethrough, conveying means to convey the articles through the inside of the vessel via inlet and outlet port means, closure means for opening and closing the inlet and outlet port means, and cooling means provided on the closure means for condensing vapors of the heat transfer liquid.

8 Claims, 5 Drawing Figures

APPARATUS FOR FUSE-BONDING ARTICLES

This invention relates generally to bonding of articles. More particularly, the present invention is directed to an apparatus for bonding two articles, maintained in a predetermined relative position, to each other with the use of a bonding agent such as a solder, provided between the two articles, by heating the two articles with hot vapors of heat transfer liquid to fuse the bonding agent.

There is known a vapor phase soldering method in which the objects to be soldered are heated to a temperature appropriate for the soldering operation by condensing thereon hot vapors of a heat transfer liquid. FIG. 5 shows an apparatus for carrying out the vapor-phase soldering method as described in U.S. Pat. No. 3,866,307, in which indicated at 1 is a vessel, at 2 a heating coil, at 3 a cooling coil and at 4 a heat transfer liquid such as a fluorinated polyoxypropyrene. The heat transfer liquid 4 is filled in the vessel 1 up to the level shown, and heated to and maintained at a temperature above its boiling point by the heating coil 2. Hot vapors 4a of the heat transfer liquid 4 are filled up to the level of the cooling coil 3, which is indicated by the chain line 5, and condensed at that level and returned to the body of the heat transfer liquid in the lower portion of the vessel 1. Denoted at 6 is a printed circuit board, at 7 a supporting member for mounting and holding the printed circuit board 6 thereon, at 8 a chip part such as an IC component to be bonded to the printed circuit board 6, and at 9 a bonding agent which is in this case soldering paste having powdery solder mixed with a paste and which is applied on the upper side of the printed circuit board 6 and on the lower side of the chip part 8 beforehand. The heat transfer liquid has a boiling point not lower than the melting point of the soldering paste.

With this arrangement, the heat transfer liquid 4 is boiled to generate vapors and to melt the soldering paste 9 by using the latent heat of the vapors. Then the holder member 7 is lifted up to cool and solidify the solder in the air with the aid of the cooling coil 3, thereby bonding the chip part 8 to the printed circuit board 6. The transfer of the printed circuit boards may be also effected with the use of a belt conveyor as disclosed in the above U.S. patent, if desired.

One problem associated with the conventional vapor phase soldering apparatus relates to a loss of the heat transfer liquid by leakage of the vapors thereof from the inlet and outlet ports for the articles to be soldered. Another problem is concerned with consumption of much heat energy. Since the body of hot, saturated vapors of the heat transfer liquid is required to be formed up to a level sufficiently higher than the level at which the printed circuit board is positioned and subjected to soldering operation, a greater part of the vapors of the heat transfer liquid are condensed on the cooling means without being utilized for heating the printed circuit board especially when the printed circuit board is small in size.

The present invention has been made to overcome the problems of the conventional vapor phase soldering apparatus. In accordance with a first aspect of the present invention, there is provided an apparatus for bonding first and second articles maintained in a predetermined relative position with a fusible bonding agent provided therebetween, comprising:

a closed vessel for containing a heat transfer liquid such that a space is defined above the liquid level of said heat transfer liquid, said heat transfer liquid having a boiling point higher than the melting point of said bonding agent;

heating means provided in said vessel for heating said heat transfer liquid within said vessel to a temperature higher than the boiling point of said heat transfer liquid so that vapors of said heat transfer liquid fill said space in said vessel;

a cooler provided in an upper portion of said space for condensing vapors of said heat transfer liquid;

entrance and exit port means provided in said vessel for communication with said space and designed to permit the passage of said first and second articles together therethrough;

means for conveying said first and second articles along a predetermined path through said space via said entrance and exit port means; and closure means provided adjacent to said entrance and exit port means and moveable for opening and closing said entrance and exit port means, said closure means being provided with cooling means for condensing the vapors of said heat transfer liquid.

In another aspect, the present invention provides an apparatus for soldering printed circuit boards having electric components mounted thereon by solder preforms, comprising:

a closed vessel for containing a heat transfer liquid such that a space is defined above the liquid level of said heat transfer liquid, said heat transfer liquid having a boiling point higher than the melting point of said solder preforms;

heating means provided in said vessel for heating said heat transfer liquid within said vessel to a temperature higher than the boiling point of said heat transfer liquid so that vapors of said heat transfer liquid fill said space in said vessel;

a cooler provided in an upper portion of said space for condensing vapors of said heat transfer liquid;

entrance and exit ports provided in said vessel for communication with said space and designed to permit the passage of the printed circuit boards therethrough;

means for conveying the printed circuit boards along a predetermined path extending through said space via said entrance and exit ports; and control means having a pair of plates which are locatable between said path and said liquid level to define an apperture therebetween through which vapors of the heat transfer liquid ascend to said path and which are moveable to permit the apperture therebetween to be adjusted.

The present invention will be described in detail below with reference to the accompanying drawings, in which.

Figure 1:
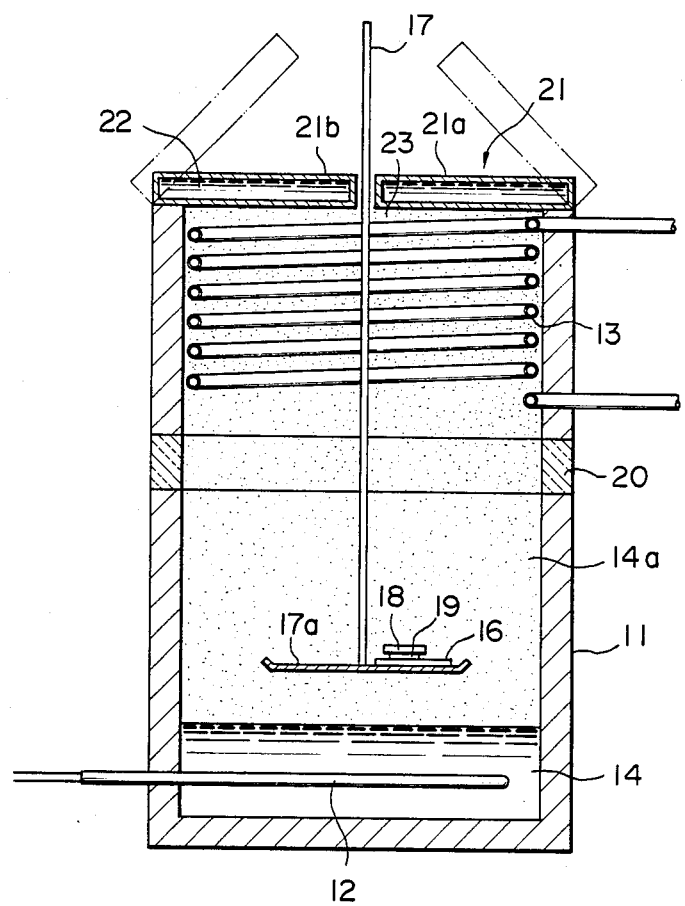
FIG. 1 is a vertical cross-sectional view diagrammatically showing one embodiment of fuse-bonding apparatus according to the present invention.

Referring first to FIG. 1, the reference numeral 11 designates a vessel for containing a heat transfer liquid 14 such as a fluorocarbon generally having a boiling point of at least 200° C., e.g. Fluorinate (trandemark of Sumitomo 3M Inc.). A heater 12 is disposed in the lower portion of the vessel 11 for heating and vaporizing the heat transfer liquid 14 so that hot vapors 14a of the heat transfer liquid 14 can fill the upper space above the liquid level of the heat transfer liquid 14. Provided in an upper portion of the vessel 11 is a cooler 13 for cooling and condensing the vapors of the heat transfer liquid 14. Thus, there are formed a heating zone in the lower portion of the upper space above the heat transfer liquid 14 and a cooling zone in the upper portion of the upper space.

The vessel 11 has its intermediate portion 20 formed of a heat insulating material such as a ceramic or a heat resisting plastic material. The heat insulating portion 20 blocks the thermal conduction therethrough from the lower portion of the vessel adjacent to the heating zone to the upper portion of the vessel adjacent to the cooling zone, so that the heating and cooling efficiencies in the heating and cooling zones, respectively, may be improved.

Designated as 17 is conveying means for conveying articles to be bonded, e.g. a printed circuit board 16 having chip part 18 previously temporarily bonded thereto with a solder paste or preform 19. The conveying means 17 has a supporting member 17a for supporting thereon the articles to be soldered and is moveable, vertically in the embodiment shown, to carry the articles to be soldered to the heating zone for effecting the soldering. That is, the solder paste 19 which has a melting point equal to or lower than the boiling point of the heat transfer liquid 14 is melted by receiving the heat energy from the vapors 14a. The fused solder is solidified when the printed circuit board 16 is withdrawn from the heating zone by the operation of the conveying means 17.

At the open top end portion 23 of the vessel 11 is provided closure means 21 for closing and opening the top end of the vessel 11. The closure means in this illustrated embodiment includes a pair of hinged hollow plate members 21a and 21b. The plate members 21a and 21b are swung to open the vessel 11 (as shown by phantom line) to allow the passage of the supporting member 17a, and are closed during the soldering operation. The inside of each of the hollow plate members 21a and 21b is continuously supplied with a cooling medium 22 so that the plate members 21a and 21b also serve to function as a cooler. Thus, the closure means 21 can effectively prevent the leakage of the vapors of the heat transfer liquid from the top open end 23.

The conveying means 17 and the closure means 21 may be operated by any suitable known activation means such as an electric motor, cams, latch, etc. The automatic synchronous activation of the closure means 21 in response to the movement of the conveying means 17 may also be effected in any suitable known mechanism.

Figure 2:
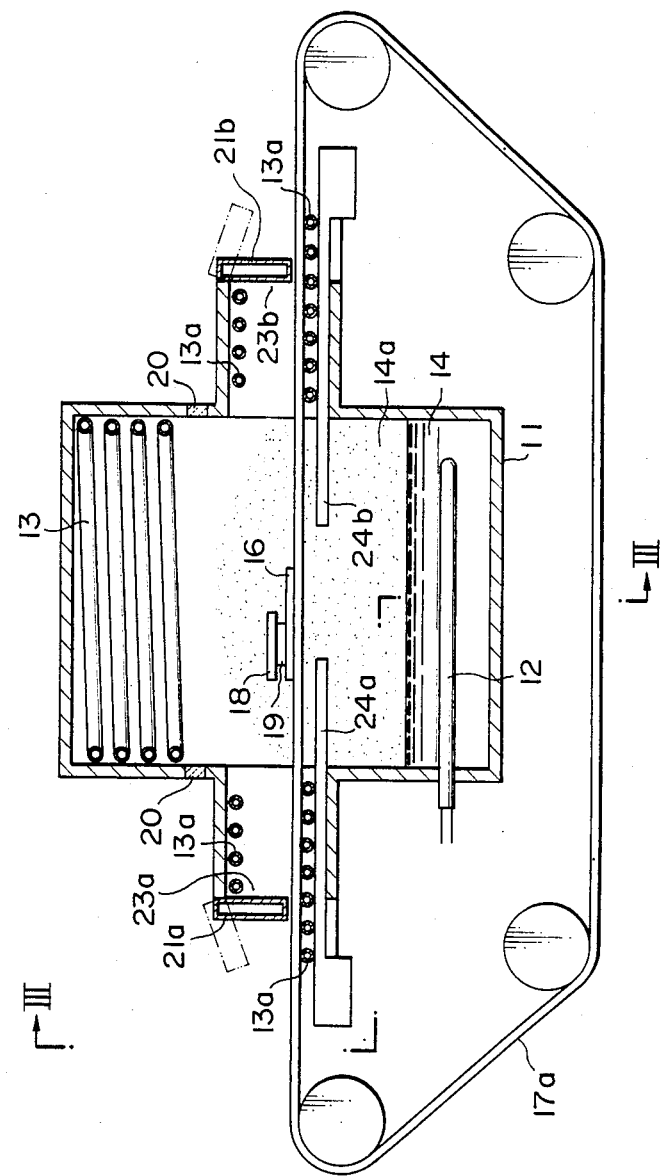
FIG. 2 is a vertical cross-sectional view diagrammatically showing an alternate embodiment of fuse-bonding apparatus according to the present invention.
Figure 3:
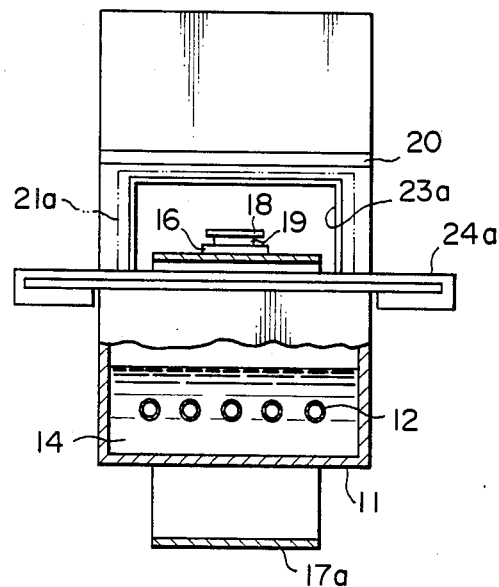
FIG. 3 is a cross-sectional view taken on line III—III in FIG. 2.

FIG. 2 illustrates another embodiment according to the present invention, in which similar component parts have been designated by the same reference numerals. In this embodiment, the articles to be bonded are supported on a conveying belt 17a and moved horizontally through the inside of a vessel 11 through a pair of opposite inlet and outlet ports 23a and 23b. Designated as 13a are coolers for condensing the heat transfer liquid. Adjacent to the inlet and outlet ports 23a and 23b are provided hollow closure plate members 21a and 21b, respectively. The plate members 21a and 21b, which are continuously supplied with a cooling medium, are swung to open the ports 23a and 23b (as shown by the phantom line in FIG. 2) to allow the passage of articles to be soldered carried by the conveyor belt 17a. During the soldering operation, the plate members 21a and 21b are closed (as shown by the phantom line in FIG. 3) to prevent the leakage of the vapors of the heat transfer liquid 14 therethrough.

In the embodiment shown in FIG. 2, means 24 is provided for controlling the height of the body of hot vapors of the heat transfer liquid so as to minimize the leakage of the vapors of the heat transfer liquid and the consumption of heat energy. The control means 24 has a pair of horizontal plates 24a and 24b locatable between the liquid level of the heat transfer liquid in the vessel 11 and the path along which the articles to be bonded travel and capable of extending into the inside of the vessel 11 and of retracting therefrom. In the fully extended state, the plates 24a and 24b are abutted to each other so that the vapors of the heat transfer liquid 14 cannot pass therethrough and cannot reach the path for contact with the articles to be bonded. By controllingly reducing the aperture between the plates 24a and 24b correspondingly to the size of the articles to be bonded, it becomes possible to decrease the amount of heat suppied by the heater 12 to the heat transfer liquid while maintaining the body of hot, saturated vapors of the heat transfer liquid at a hight suitable to effect the bonding operation.

Figure 4:
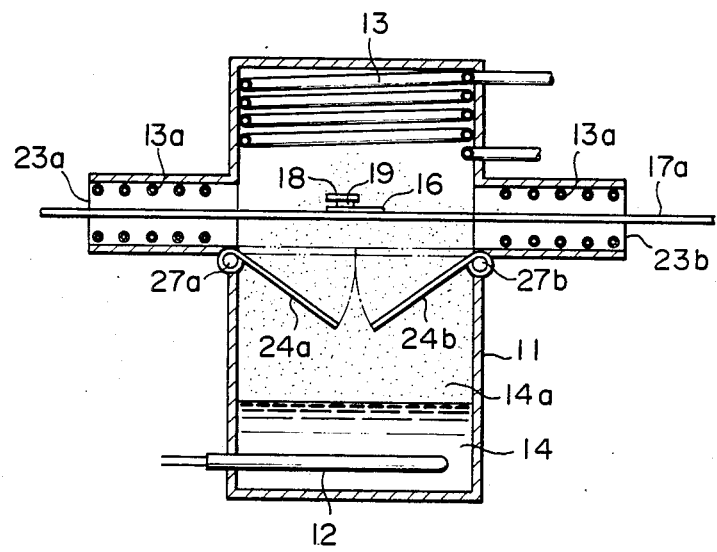
FIG. 4 is a vertical cross-sectional view, similar to FIG. 2, diagrammatically showing a further alternate embodiment according to the present invention.
Figure 5:
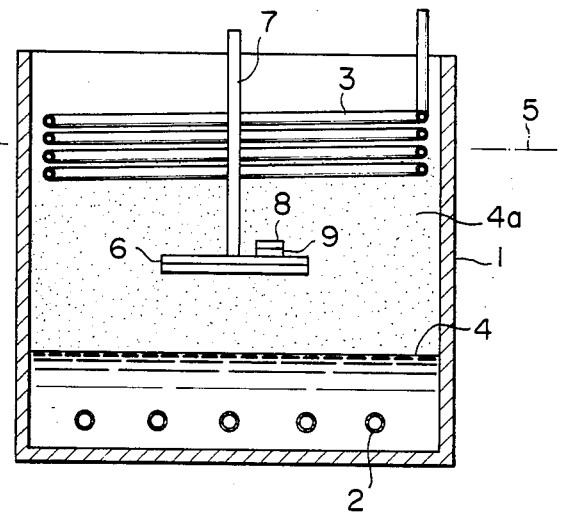
FIG. 5 is a vertical cross-sectional view, similar to FIG. 1, showing a conventional soldering apparatus.

FIG. 4 illustrates a variant of the bonding apparatus shown in FIG. 2, in which similar component parts have been designated by the same reference numerals. The control means in this variant includes a pair of hinged plate members 24a and 24b swingably mounted about shafts 27a and 27b, respectively. By adjusting the angle or orientation of the plate members 24a and 24b by any suitable drive means, the area of the aperture therebetween can be varied. Though this variant is not provided with the closure means as shown in FIG. 2, the provision thereof is preferred. The control means as shown in FIG. 2 or 4 may be also provided in the apparatus shown in FIG. 1, if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. An apparatus for bonding first and second articles maintained in a predetermined relative position with a fusible bonding agent provided therebetween, comprising:

a closed vessel for containing a heat transfer liquid such that a space is defined above the liquid level of said heat transfer liquid, said heat transfer liquid having a boiling point higher than the melting point of said bonding agent;

heating means provided in said vessel for heating said heat transfer liquid within said vessel to a temperature higher than the boiling point of said heat transfer liquid so that vapors of said heat transfer liquid fill said space in said vessel;

a cooler provided in an upper portion of said space for condensing vapors of said heat transfer liquid;

entrance and exit port means provided in said vessel for communication with said space and designed to permit the passage of said first and second articles together therethrough;

means for conveying said first and second articles along a predetermined path through said space via said entrance and exit port means; and closure means provided adjacent to said entrance and exit port means and moveable for opening and closing said entrance and exit port means, said closure means being provided with cooling means therein for condensing the vapors of said heat transfer liquid.

2. An apparatus as claimed in claim 1, wherein said entrance and exit port means is an opening provided at the top of said vessel and said conveying means include means adapted for supporting said first and second articles thereon and for vertically displacing up and down therewith.

3. An apparatus as claimed in claim 2, wherein said vessel has a middle portion formed of a heat insulating material so that heat transfer between portions of said vessel across said middle portion is minimized.

4. An apparatus as claimed in claim 1, further comprising control means having a pair of plates which are locatable between said path and said liquid level to define an apperture therebetween through which vapors of the heat transfer liquid ascend to said path and which are moveable to permit the apperture therebetween to be adjusted.

5. An apparatus for soldering printed circuit boards having electric components mounted thereon by solder preforms, comprising:

a closed vessel for containing a heat transfer liquid such that a space is defined above the liquid level of said heat transfer liquid, said heat transfer liquid having a boiling point higher than the melting point of said solder preforms;

heating means provided in said vessel for heating said heat transfer liquid within said vessel to a temperature higher than the boiling point of said heat transfer liquid so that vapors of said heat transfer liquid fill said space in said vessel;

a cooler provided in an upper portion of said space for condensing vapors of said heat transfer liquid;

entrance and exit ports provided in said vessel for communication with said space and designed to permit the passage of the printed circuit boards therethrough;

means for conveying the printed circuit boards along a predetermined path extending through said space via said entrance and exit ports; and control means having a pair of plates which are locatable between said path and said liquid level to define an aperture therebetween through which vapors of the heat transfer liquid ascend to said path and both of which are moveable to permit the apperture therebetween to be adjusted.

6. An apparatus as claimed in claim 5, wherein said entrance and exit port means includes a pair of opposite openings provided in the side wall of said vessel and said conveying means includes a belt conveyor capable of supporting said articles thereon and having a portion horizontally running through said space.

7. An apparatus as claimed in claim 6, wherein said pair of plates are slidably mounted plates.

8. An apparatus as claimed in claim 6, wherein said pair of plates are swingably mounted plates.

* * * * *